United States Patent [19]
Gioutsos et al.

[11] Patent Number: 5,541,842
[45] Date of Patent: Jul. 30, 1996

[54] SYSTEM AND METHOD FOR ADJUSTING ACCUMULATED CRASH-DISCRIMINATION MEASURES BASED ON CRASH PROGRESS

[75] Inventors: Tony Gioutsos, Brighton; Daniel N. Tabar, Troy, both of Mich.

[73] Assignee: Automotive Systems Laboratory, Inc., Farmington Hills, Mich.

[21] Appl. No.: 298,844

[22] Filed: Aug. 31, 1994

Related U.S. Application Data

[63] Continuation-in-part of Ser. No. 773,017, Oct. 8, 1991, Pat. No. 5,508,918.

[51] Int. Cl.⁶ .................................................. B60R 21/16
[52] U.S. Cl. .................. 364/424.05; 340/436; 280/735; 180/282
[58] Field of Search .................. 364/424.05; 280/728.1, 280/734, 735; 180/274, 282; 340/436, 438

[56] References Cited

U.S. PATENT DOCUMENTS

| | | | |
|---|---|---|---|
| 3,911,391 | 10/1975 | Held et al. | 280/735 |
| 4,994,972 | 2/1991 | Diller | 364/424.05 |
| 5,021,678 | 6/1991 | Diller | 280/734 |
| 5,157,268 | 10/1992 | Spies et al. | 280/735 |
| 5,229,943 | 7/1993 | Eigler et al. | 364/424.05 |
| 5,282,134 | 1/1994 | Gioutsos et al. | 364/424.05 |
| 5,337,238 | 8/1994 | Gioutsos et al. | 364/424.05 |
| 5,363,302 | 11/1994 | Allen et al. | 364/424.05 |
| 5,419,407 | 5/1995 | Meyer et al. | 180/274 |
| 5,424,584 | 6/1995 | Matsuda et al. | 340/438 |

*Primary Examiner*—Vincent N. Trans

[57] ABSTRACT

A system and method for controlling actuation of a vehicle passenger safety device in response to an event possibly requiring actuation of the safety device, wherein a first measure calculated from received vehicle acceleration information is weighted by a second measure, such as a modified vehicle velocity measure, which is itself evaluative of the relative progress of the event. The weighted first measure is thereafter accumulated and compared to a threshold value, with the safety device being actuated when the resulting accumulated weighted first measure exceeds the threshold value.

18 Claims, 2 Drawing Sheets

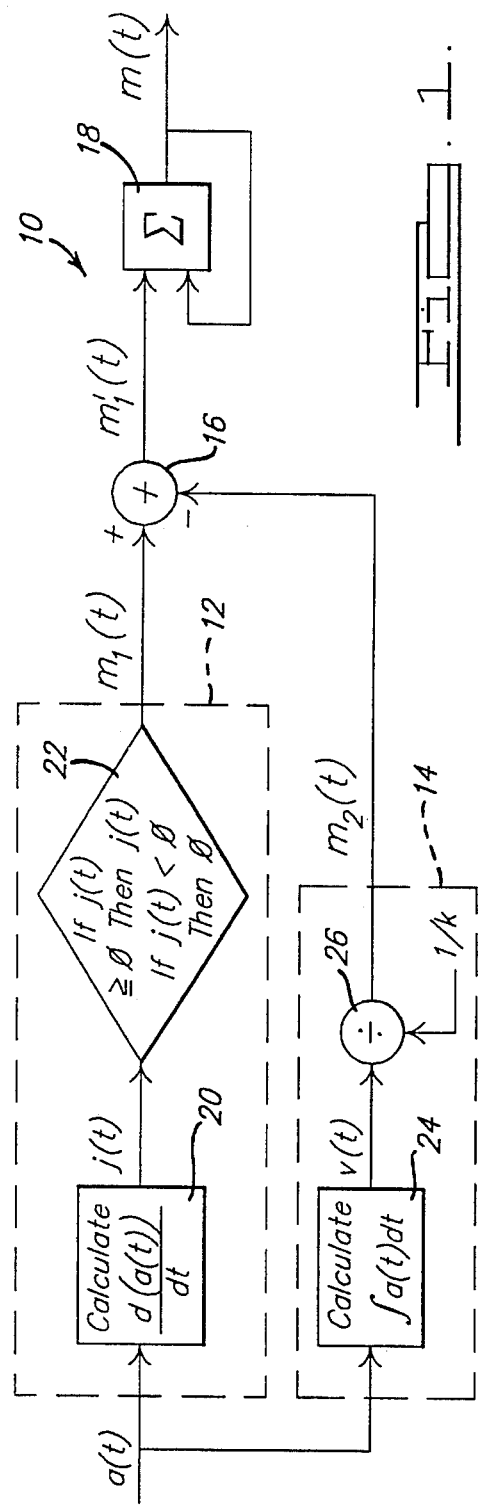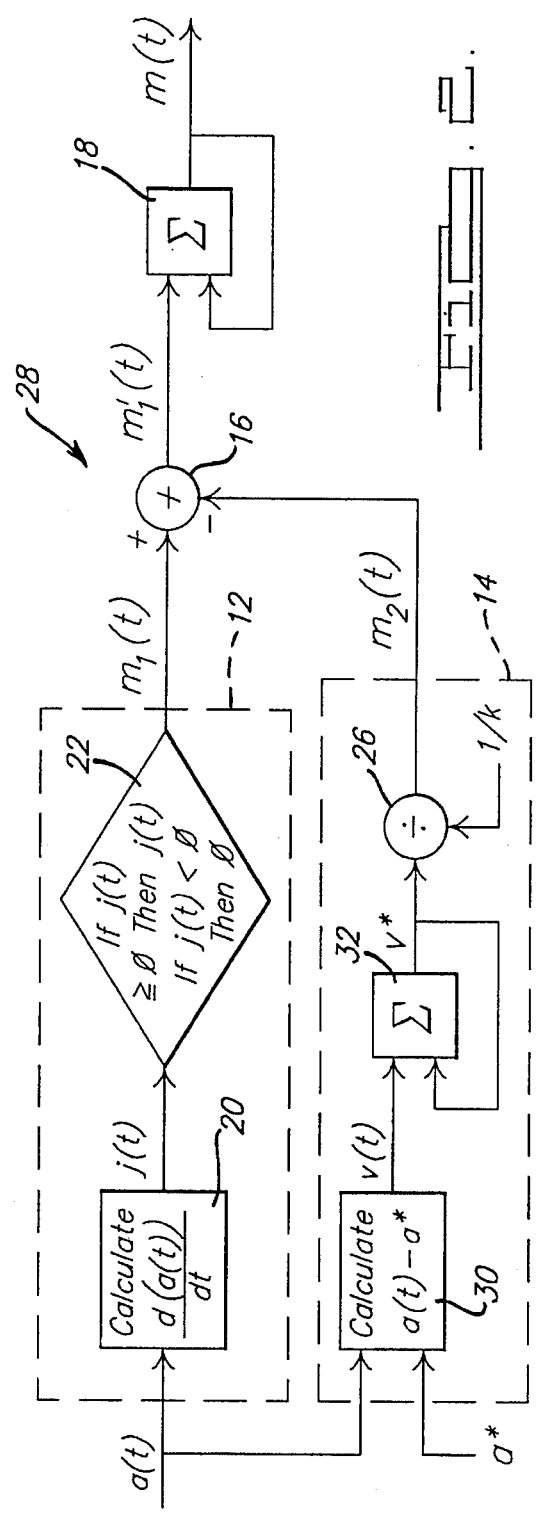

SYSTEM AND METHOD FOR ADJUSTING ACCUMULATED CRASH-DISCRIMINATION MEASURES BASED ON CRASH PROGRESS

CROSS-REFERENCE TO RELATED APPLICATIONS

The instant application is a continuation-in-part of U.S. patent application Ser. No. 07/773,017, entitled "Predictor/Check Crash Discriminator," filed on Oct. 8, 1991, now U.S. Pat. No. 5,508,918.

BACKGROUND OF THE INVENTION

The instant invention relates to systems and methods for controlling the actuation of vehicle safety devices and, more particularly, to systems and methods which utilize one or more evaluative measures with which to analyze events possibly requiring actuation of the safety device, wherein each measure is a function of received physical information such as transitory vehicle acceleration information and/or the transitory position of a passenger relative to a fixed structure within the vehicle, and wherein at least one of the measures is accumulated or integrated over time.

A variety of systems and methods for actuating vehicle safety devices are well known in the art. Such systems are used to sense an event: such as a crash condition and, in response to such an event, to actuate an air bag, or lock a seat belt, or actuate a pretensioner for a seat belt retractor. Typically, the safety device is actuated into its protective position when an impact exceeding a predetermined magnitude is detected by the actuating system.

Significantly, known systems and methods for controlling actuation of vehicle safety devices typically rely on changes in one or more estimated physical quantities or crash-discrimination "measures" in determining whether to actuate the safety device. Oftentimes, these evaluative measures are obtained by accumulating values generated from received physical information such as transitory vehicle acceleration information and/or the transitory position of a passenger relative to a fixed structure within the vehicle, as where a vehicle velocity measure is obtained by accumulating/integrating received vehicle acceleration information over time. And, frequently, the function underlying the accumulated measure generates only positive values, as where the measure is representative of accumulated positive jerk (where jerk is the rate of change of the received acceleration information with respect to time, with accumulated positive jerk being useful as representing average clipped jerk) or accumulated variance (where variance is itself a statistical measure of variation among a given number of sampled values, with accumulated positive variance being useful as representing total vehicle crush).

Unfortunately, the use of accumulated measures based on positive-value-only functions have proved highly problematic when encountering certain waveforms. For example, where a given crash waveform includes a resonance component, i.e., where the waveform has a frequency component in the range between about 50 Hz and about 300 Hz, an accumulated measure based on positive jerk or positive variance will become unduly large and, hence, will surpass a predetermined threshold to trigger actuation of the safety device either too early in the crash or responsive to an event not otherwise requiring actuation of the safety device. Stated another way, resonant waveforms can effectively reduce the triggering threshold for a system which employs accumulated measures, with an attendant reduction in the degree of protection afforded to vehicle passengers. A similar effect is produced by so-called "double-hump" waveforms, nominally characterized by large initial acceleration values, moderate intermediate acceleration values, and very large final acceleration values, as might be generated from received acceleration information during a high-speed pole crash due to the collapse of a vehicle crush zone.

And, while the prior art has attempted to overcome the difficulties generated with resonant and double-hump waveforms by accumulating both positive and negative values generated by the measure's underlying function, this approach eliminates the monotonicity of the accumulated measure and, hence, reduces the utility of such measures both in properly identifying the "ON" conditions requiring actuation of the safety device, and the appropriate timing thereof.

What is needed is a system and method for controlling actuation of a vehicle passenger safety device employing an accumulated positive-value-only evaluative measure which is not otherwise susceptible to indicating a false "ON" condition in response to either resonant or double-hump waveforms.

SUMMARY OF THE INVENTION

It is an object of the instant invention to provide an improved system and method for controlling actuation of a vehicle passenger safety device responsive to an event generating a resonant waveform.

Another object of the instant invention is to provide an improved system and method for controlling actuation of a vehicle passenger safety device responsive to an event generating a double hump waveform.

Another object of the instant invention is to provide an improved system and method for controlling actuation of a vehicle passenger safety device responsive to an event possibly requiring same wherein the values underlying one or more accumulated evaluative measures are themselves weighted as a function of the relative progress of the event itself prior to their accumulation.

Yet another object of the instant invention is to provide an improved system and method for controlling actuation of a vehicle passenger safety device responsive to an event possibly requiring same wherein positive-value-only evaluative measures are weighted by another measure approximating the relative progress of the event prior to their accumulation for ultimate use in determining whether to actuate the safety device.

Under the invention, in a system and method for controlling actuation of a vehicle passenger safety device in response to an event possibly requiring actuation of the device, wherein a first measure, itself a function of received physical information such as received vehicle acceleration information or transitory passenger position information, is accumulated to obtain an accumulated measure useful in determining event severity as through subsequent comparison with a threshold value, the first measure is weighted prior to accumulation by subtracting therefrom a second measure whose temporal value is representative of the relative progress of the event.

Under the invention, the first measure is a function of the received physical information approximating such relevant physical quantities as vehicle acceleration, vehicle jerk (differentiated vehicle acceleration), vehicle velocity (integrated vehicle acceleration), relative passenger velocity (as perhaps approximated from temporal relative position sensing means), relative passenger jerk, and/or relative passenger position within the vehicle. And, in a preferred embodiment, the second measure used to weight the first measure prior to its accumulation is a vehicle velocity value obtained by accumulating received vehicle acceleration information or, better still, a "modified" velocity value obtained by accumulating received vehicle acceleration information after subtracting therefrom a correction value representing the acceleration that a passenger may be expected to withstand without requiring actuation of the safety device. However, as with the first measure, the second measure may alternatively be a function of other received physical information, so long as it remains representative of the relative progress of the event being analyzed in accordance with the invention.

BRIEF DESCRIPTION OF THE DRAWINGS

FIG. 1 is a diagrammatic schematic of a first exemplary implementing circuit for use in a system for controlling actuation of a vehicle passenger safety device, wherein the first, weighted measure is a positive-only vehicle jerk value and the second, weighting measure is a scaled vehicle velocity value;

FIG. 3 is a diagrammatic schematic of a third exemplary implementing circuit for use in a system for controlling actuation of a vehicle passenger safety device, wherein the first, weighted measure is a variance value (itself inherently positive) and the second, weighting measure is a scaled modified vehicle velocity value.

DETAILED DESCRIPTION OF THE PREFERRED EMBODIMENT(S)

Figure 2:
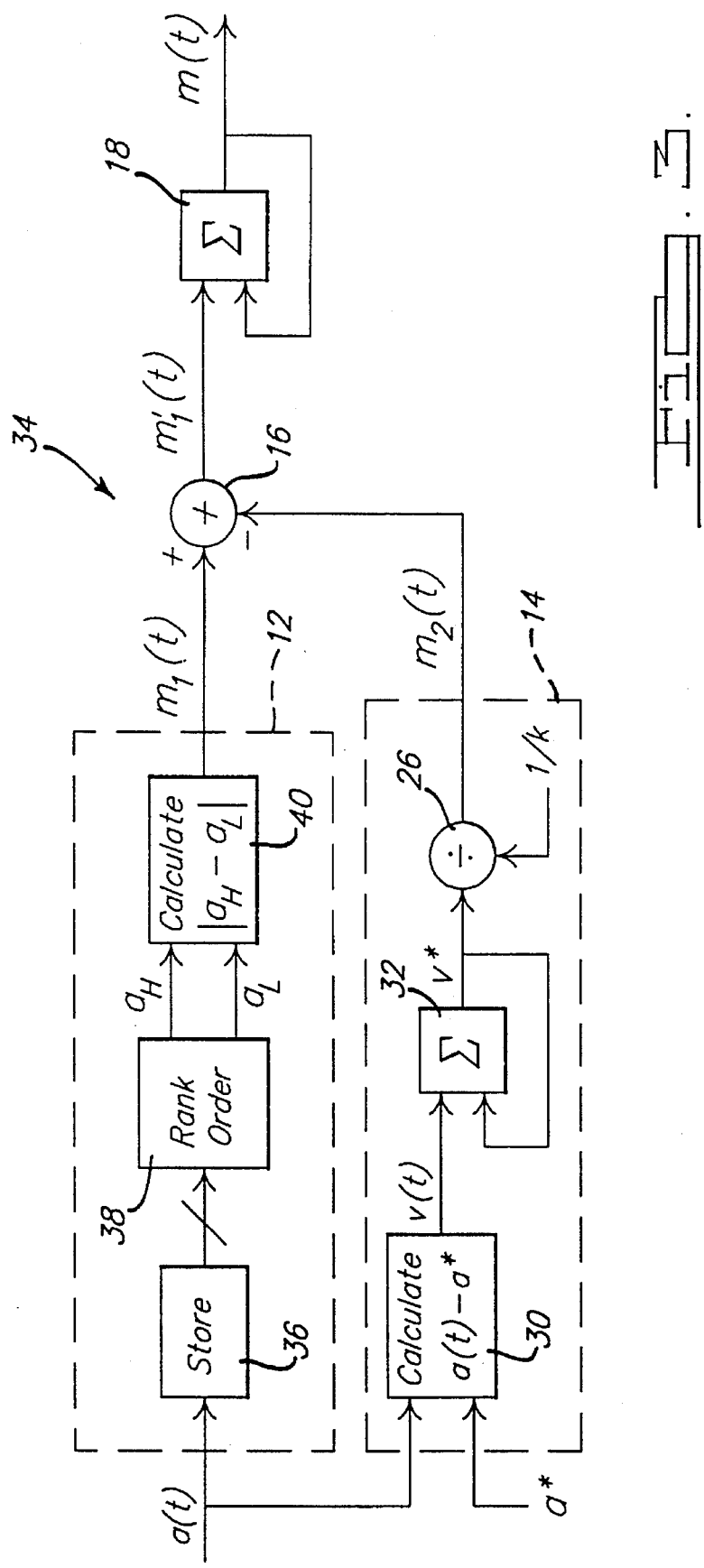
FIG. 2 is a diagrammatic schematic of a second exemplary implementing circuit for use in a system for controlling actuation of a vehicle passenger safety device, wherein the first, weighted measure is a positive-only vehicle jerk value and the second, weighting measure is a scaled modified vehicle velocity value.

Referring to the drawings, wherein like components are identified by like reference numbers in each of the several Figures, FIG. 1 is a diagrammatic schematic of a first exemplary implementing circuit 10 for use in a system for controlling actuation of a vehicle passenger safety device, such as an air bag (not shown). Specifically, the circuit 10 includes a first means indicated generally at 12 for generating a first measure $m_1(t)$ based on received acceleration information a(t) and useful in determining the severity of an event when accumulated/integrated over time; a second means indicated generally at 14 for generating a second measure $m_2(t)$ which approximates the relative progress of a given event (irrespective of "real" or "actual" time); a summing junction 16 for weighting the first measure $m_1(t)$ with the second measure $m_2(t)$ by subtracting the latter from the former, thereby obtaining a weighted first measure $m_1'(t)$; and an accumulator 18 for accumulating the weighted first measure $m_1'(t)$ over time to obtain the desired output, specifically, a measure m(t) evaluative of the severity of the event useful in discriminating a crash event from an event not otherwise requiring actuation of the safety device. Under the invention, since the first measure $m_1(t)$ is weighted in the summing junction 16 using the second measure $m_2(t)$ representative of the progress of the event, weighted values for the first measure $m_1'(t)$ generated earlier in an event will contribute more significantly to the accumulated measure m(t) (and, hence, will carry more weight in crash-discrimination) than will later values therefor—an effective approach in dealing with resonance and, particularly, with double-hump waveforms, since it is the later-occurring second hump which renders such waveforms problematic.

Returning to the first exemplary circuit 10 shown in FIG. 1, the means 12 for generating the first measure $m_1(t)$ specifically includes a calculating means 20 for calculating vehicle jerk values j(t) from received vehicle acceleration information a(t) (the latter being generated in a known manner by an acceleration sensor, not shown); and a decision means 22 for passing through only positive vehicle jerk values j(t). The means 14 for generating the second measure $m_2(t)$ includes a second calculating means 24 for integrating the received vehicle acceleration information a(t) over time to obtain a vehicle velocity value v(t); and a divider 26 for scaling the vehicle velocity value v(t) with a suitable scaling factor k, whereby the range of values for the second measure $m_2(t)$ may be suitably adjusted. In this regard, it is noted that, where a scaling factor k of, for example, 2 is desired, the divider 26 is readily implemented in a digital circuit in the form of a shift register.

As noted above, by weighting or scaling the first measure $m_1(t)$ using the second measure $m_2(t)$ representative of the relative temporal progress of an event prior to its accumulation, the impact of resonance and, particularly, the second hump in a double-hump waveform, on the ultimate, accumulated measure m(t) is appropriately reduced, whereby the system is no longer fooled by such waveforms into triggering actuation of the safety device where such actuation is unnecessary or undesirable. Moreover, the accumulation of weighted first measures $m_1'(t)$ under the invention ensures that transitory values for the first measure $m_1(t)$ calculated during the latter portion of the event will still be included in the evaluation of the event, albeit with reduced influence—this, in contrast with the sliding window techniques and/or time-varying threshold approaches of the prior art. Thus, in the first exemplary circuit 10 shown in FIG. 1, under the invention, positive transitory jerk values j(t) generated at lower calculated vehicle velocities v(t) will carry greater weight than positive transitory jerk values j(t) generated at higher estimated vehicle velocities v(t).

FIG. 2 shows a second exemplary implementing circuit 28 for use in a system for controlling actuation of a vehicle passenger safety device. Specifically, in the second exemplary circuit 28, the means 12 for generating the first measure $m_1(t)$ again includes the calculating means 20 for calculating vehicle jerk values j(t) from received vehicle acceleration information a(t), and the decision means 22 for passing through only positive vehicle jerk values j(t). In contrast with the first exemplary circuit 10 shown in FIG. 1, however, the means 14 for generating the second measure $m_2(t)$ in the second exemplary circuit 28 includes a calculating means 30 for calculating modified values for received vehicle acceleration information by subtracting therefrom a correction value a* representing the amount of acceleration that a passenger may be expected to withstand without requiring actuation of the safety device; and a second accumulator 32 for accumulating the modified acceleration information to obtain a modified velocity value v* representative of the progress of the event being analyzed.

As in the first exemplary circuit 10, the modified velocity value v* is again scaled in the divider 26 using a suitable scaling factor k to obtain the second, weighting measure $m_2(t)$. As in the first exemplary circuit 10, the second measure $m_2(t)$ is then input to the summing junction 16 for use in weighting the first measure $m_1(t)$, and the resulting weighted first measure $m_1'(t)$ is accumulated in the first accumulator 18 to obtain the desired (accumulated) measure m(t).

FIG. 3 shows a third exemplary implementing circuit 34 for use in a system for controlling actuation of a vehicle passenger safety device, wherein the first measure $m_1(t)$ is representative of the temporal variance of the received vehicle acceleration information, and the second, weighting measure $m_2(t)$ is scaled modified vehicle velocity v*. Specifically, in the third exemplary circuit 34, the means 12 for generating the first measure $m_1(t)$ includes a storage means 36, such as a RAM, for storing consecutive values of received vehicle acceleration information; a rank-order means 38, such as a pair of rank-order filters, for rank-ordering the values for received vehicle acceleration information stored in the storage means 36 to obtain the highest-ranked value $a_H$ and the lowest-ranked value $a_L$; and a calculating means 40 to calculate the first measure $m_1(t)$ as the absolute value of the temporal variance of the received vehicle acceleration information, that is, as the absolute value of the difference between the highest-ranked value $a_H$ and the lowest-ranked value $a_L$.

As in the second exemplary circuit 28, the means 14 for generating the second measure $m_2(t)$ in the third exemplary circuit 34 includes the calculating means 30 for calculating modified values for received vehicle acceleration information by subtracting the correction value a* from transitory values for the received vehicle acceleration information a(t); and a second accumulator 32 for accumulating the modified vehicle acceleration information to obtain a modified velocity value v* representative of the progress of the event being analyzed.

And, as in the first and second exemplary circuits 10 and 28, in the third exemplary circuit 34, the modified velocity value v* is again scaled in the divider 26 using a suitable scaling factor k to obtain the second, weighting measure $m_2(t)$, which is then input $m_2(t)$ to the summing junction 16 for use in weighting the first measure $m_1(t)$. The resulting weighted first measure $m_1'(t)$ is accumulated in the first accumulator 18 to obtain the desired (accumulated) measure m(t).

While the preferred embodiment of the invention has been disclosed, it should be appreciated that the invention is susceptible of modification without departing from the spirit of the invention or the scope of the subjoined claims. For example, while the invention is disclosed herein with respect to systems and methods for controlling actuation of a vehicle passenger safety device based on accumulated jerk or accumulated variance, the invention is applicable to any system and method for controlling actuation of the safety device in which any measure is permitted to accumulate over time so as to indicate an "ON" condition where, in fact, no requirement for safety device actuation exists.

We claim:

1. In a system for controlling actuation of a vehicle passenger safety device to protect a vehicle passenger against injury upon the occurrence of an event possibly requiring actuation of said safety device, said system including:

means for receiving information from the group consisting of vehicle acceleration information and vehicle passenger position information;

means for generating a first measure based on said received information as a function of time;

accumulating means for accumulating said first measure over time to obtain an accumulated first measure; and actuating means responsive to said accumulated first measure for actuating said safety device when said accumulated first measure exceeds a first threshold value therefor, the improvement comprising:

means for generating a second measure based on said received information, said second measure being representative of the progress of said event;

means for weighting said first measure using said second measure prior to accumulating said first measure in said accumulating means, whereby said first measure is weighted as a function of the progress of said event.

2. The system of claim 1, wherein said means for weighting said first measure using said second measure includes means for subtracting said second measure from said first measure.

3. The system of claim 2, wherein said means for weighting said first measure using said second measure further includes a first means for scaling said second measure with a first scaling factor before subtracting said second measure from said first measure in said subtracting means.

4. The system of claim 1, wherein said means for generating said second measure includes second means for accumulating said received information over time to obtain accumulated received information, whereby said second measure is representative of vehicle velocity.

5. The system of claim 4, wherein said means for generating said second measure further includes a second means for scaling said accumulated received information using a second scaling factor, whereby said second measure is representative of scaled vehicle velocity.

6. The system of claim 5, wherein said means for generating said second measure further includes a means for modifying said received information prior to accumulating said received information in said second accumulating means.

7. The system of claim 6, wherein said means for modifying said received information includes means for subtracting from said received information a predetermined constant representative of an acceleration which a passenger can be expected to withstand without requiring actuation of said safety device.

8. In a method for controlling actuation of a vehicle passenger safety device to protect a vehicle passenger against injury upon the occurrence of an event possibly requiring actuation of said safety device, said method including the steps of:

receiving information from the group consisting of vehicle acceleration information and vehicle passenger position information;

calculating a first time-varying measure based on said received information as a function of time;

accumulating said first measure over time to obtain an accumulated first measure;

comparing said accumulated first measure to a first threshold value; and actuating said safety device when said accumulated first measure exceeds said first threshold value, the improvement comprising:

generating a second measure based on said received information, said second measure approximating the relative progress of said event; and weighting said first measure using said second measure prior to accumulation thereof by subtracting said second measure from said first measure.

9. The method of claim 8, wherein said step of generating said second measure includes the step of accumulating said received information over time to obtain a vehicle velocity value.

10. The method of claim 9, wherein said step of calculating said second measure further includes the step of modifying said received information using a correction value prior to said step of accumulating said received information over time to obtain said vehicle velocity value.

11. The method of claim 10, wherein said step of generating said first measure includes the steps of determining the rate of change of said received information with respect to time to obtain a jerk value, and determining the absolute value of said jerk value to obtain said first measure.

12. The method of claim 8, wherein said step of receiving information representative of instantaneous vehicle acceleration comprises the steps of sampling instantaneous vehicle acceleration information generated by an acceleration sensor, and storing said sampled information in a memory means as digital data; and wherein said step of generating said first measure includes the steps of rank-order filtering said stored digital data to obtain at least two rank-order values from said stored digital data, determining a variance value from said at least two rank-order values, and determining the absolute value of said variance value.

13. A method for controlling actuation of a vehicle passenger safety device for protecting a vehicle passenger against injury upon the occurrence of an event possibly requiring actuation of said safety device, said method comprising the steps of:

receiving information representative of instantaneous vehicle acceleration or vehicle passenger position relative to a fixed point within the vehicle;

generating a first measure which is evaluative of said received information in relation to time;

generating a second measure correlated with the progress of said event based on said received information;

weighting said first measure using said second measure to obtain a weighted first measure;

accumulating said weighted first measure to obtain an accumulated weighted first measure;

comparing said accumulated weighted first measure to a first threshold value; and actuating said vehicle safety device if said accumulated weighted first measure has exceeded said first threshold value.

14. The method of claim 13, wherein said step of generating said second measure includes the step of accumulating said received information over time to obtain a vehicle velocity value.

15. The method of claim 14, wherein said step of calculating said second measure further includes the step of modifying said received information using a correction value prior to said step of accumulating said received information over time to obtain said vehicle velocity value.

16. The method of claim 15, wherein said correction value is a predetermined constant representative of an acceleration which a passenger can be expected to withstand without requiring actuation of said safety device.

17. The method of claim 13, wherein said step of generating said first measure includes the steps of determining the rate of change of said received information with respect to time to obtain a jerk value, and determining the absolute value of said jerk value to obtain said first measure.

18. The method of claim 13, wherein said step of receiving information representative of instantaneous vehicle acceleration comprises the steps of sampling instantaneous vehicle acceleration information generated by an acceleration sensor, and storing said sampled information in a memory means as digital data; and wherein said step of generating said first measure includes the steps of rank-order filtering said stored digital data to obtain at least two rank-order values from said stored digital data, determining a variance value from said at least two rank-order values, and determining the absolute value of said variance value.

* * * * *